US005455852A

United States Patent [19]
Elrod et al.

[11] Patent Number: 5,455,852
[45] Date of Patent: Oct. 3, 1995

[54] METHOD AND APPARATUS FOR DEFINING PARAMETER TRANSMISSION PROTOCOLS FOR A CALL INTERCEPT/MESSAGE DELIVERY TELEPHONE SYSTEM

[75] Inventors: Edwin M. Elrod, Downingtown, Pa.; Carl R. Faix, Cherry Hill, N.J.; John U. Daniel, West Chester, Pa.

[73] Assignee: Unisys Corporation, Blue Bell, Pa.

[21] Appl. No.: 133,474

[22] Filed: Oct. 7, 1993

[51] Int. Cl.[6] .................................................. H04M 1/64
[52] U.S. Cl. ............................. 379/67; 379/89; 379/201
[58] Field of Search ................................ 379/67, 84, 88, 379/201, 89

[56] References Cited

U.S. PATENT DOCUMENTS

| | | | |
|---|---|---|---|
| 4,766,604 | 8/1988 | Axberg | 379/69 |
| 5,133,004 | 7/1992 | Heileman, Jr. et al. | 379/88 |
| 5,134,646 | 7/1992 | Carlson | 379/67 |
| 5,150,399 | 9/1992 | Yasuda | 379/67 |

*Primary Examiner*—Jeffery A. Hofsass
*Assistant Examiner*—Fan Tsang

*Attorney, Agent, or Firm*—Albert B. Cooper; Mark T. Starr

[57] ABSTRACT

A Voice Messaging System (VMS) offers a voice store and forward service to a caller on an incomplete call. The caller records the voice message at a Message Delivery System (MDS) via an Intercept Processing Unit (IPU) during a recording session. Call related parameters are transferred from the IPU to the MDS utilizing a handshake protocol specific to the IPU. The VMS accommodates different types of IPUs having different call parameter transfer protocols. The system displays, on the administration terminal, protocol maintenance screens including a generic list of call parameters with fields for entering the order and field length of selected parameters so as to designate a protocol specification to the system. The fields also include information regarding the delimiters utilized to separate the parameters of a parameter string and to designate the end of a parameter string. The protocol specifications are stored in protocol tables keyed by CALLTYPE designating the type of IPU calling the MDS. A split protocol is implemented where a first string of parameters is transmitted prior to the recording session and a second string after the recording session. A special protocol state denoted as RECORD is utilized for this purpose and entered into the protocol maintenance screens.

25 Claims, 12 Drawing Sheets

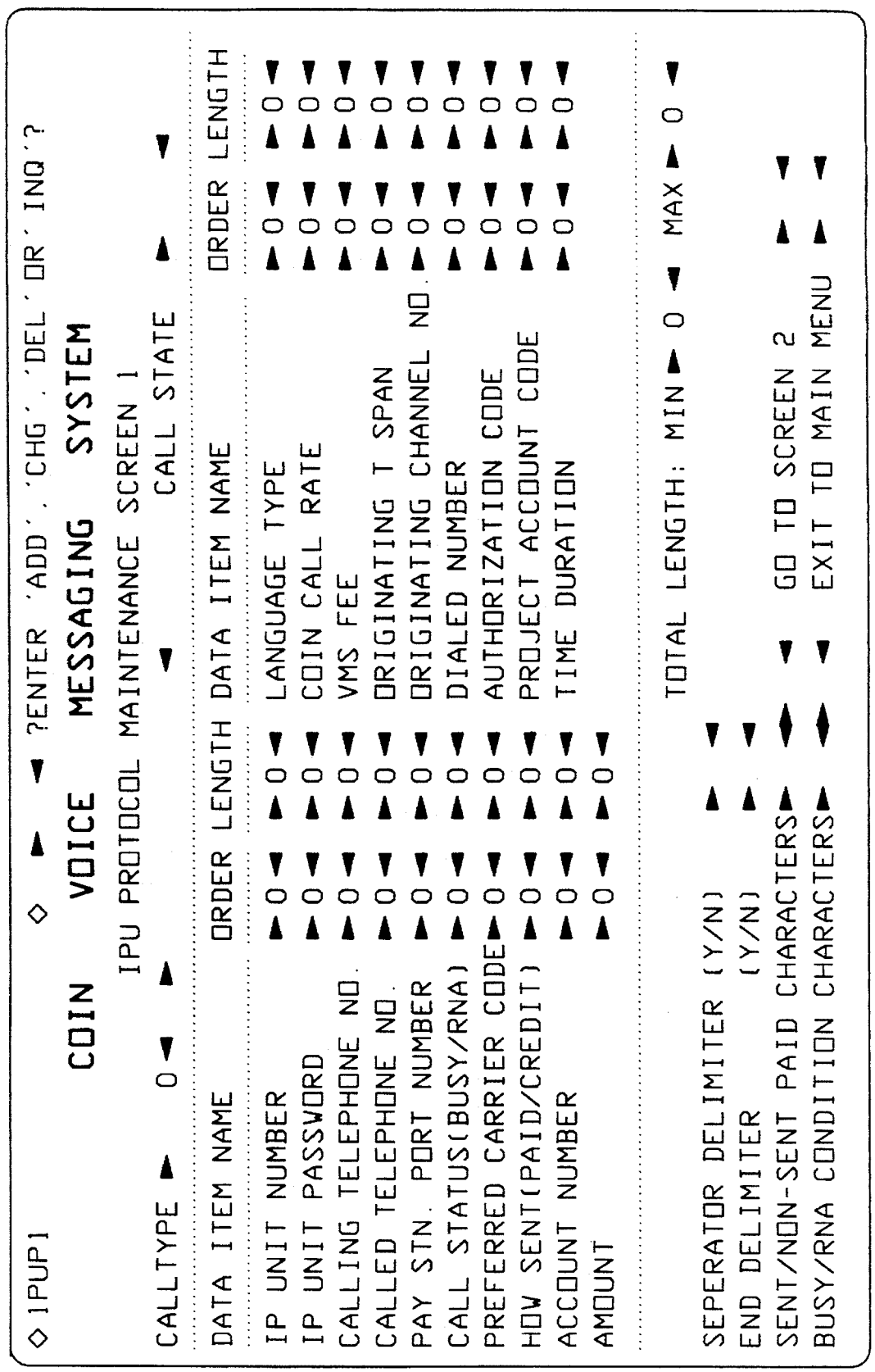
FIG. 5A (IPUP1)

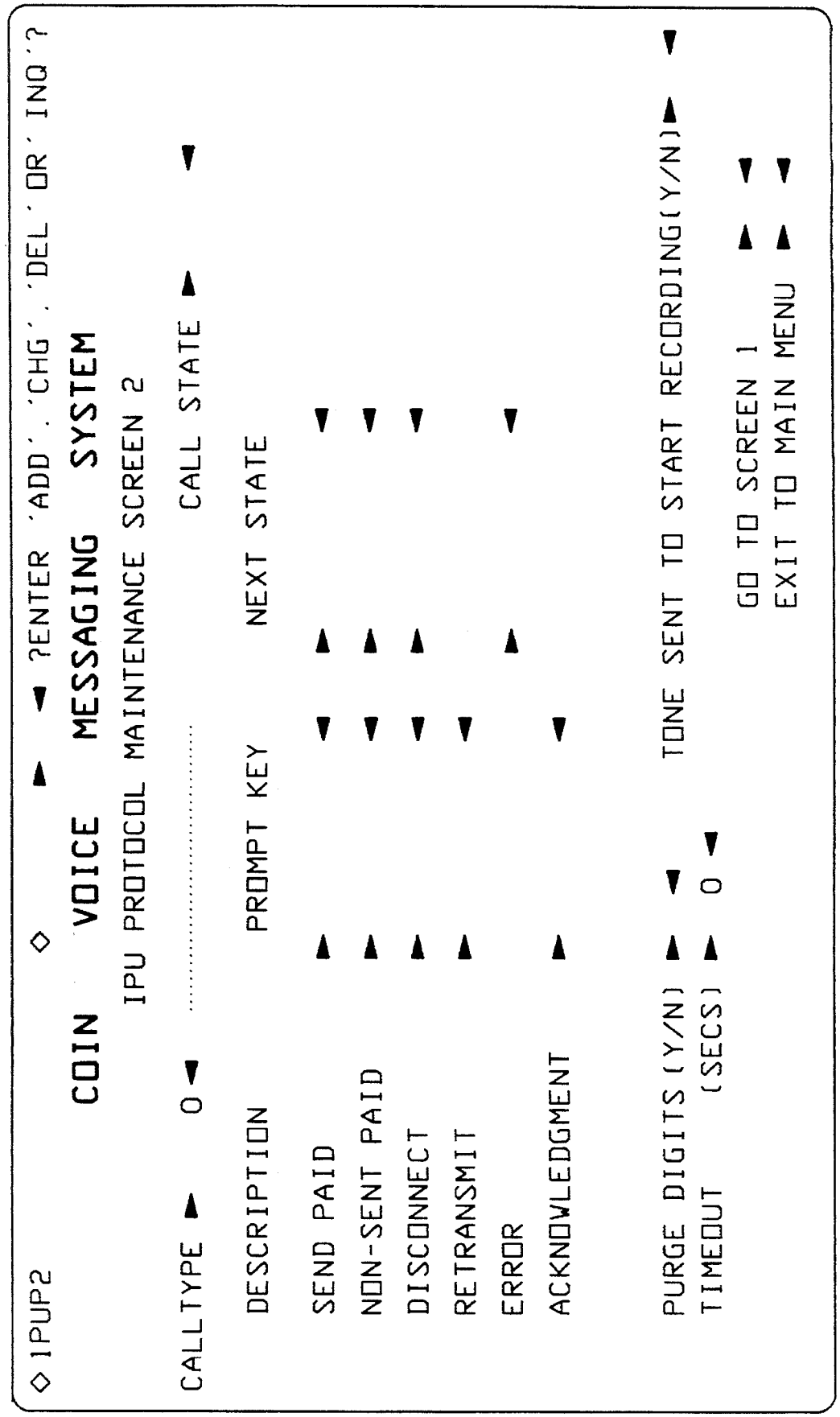
FIG. 5B (IPUP2)

◇ IPUP1　　　　　　　◇ ▲ ▼ ?ENTER 'ADD','CHG','DEL' OR 'INQ'?

COIN VOICE MESSAGING SYSTEM

IPU PROTOCOL MAINTENANCE SCREEN 1
CALLTYPE 000201　　UNISYS PROTOCOL　　　　CALL STATE INCMG

| DATA ITEM NAME | ORDER LENGTH | DATA ITEM NAME | ORDER LENGTH |
|---|---|---|---|
| IP UNIT NUMBER | | LANGUAGE TYPE | |
| IP UNIT PASSWORD | | COIN CALL RATE | |
| CALLING TELEPHONE NO. | 01　10 | VMS FEE | |
| CALLED TELEPHONE NO. | 02　10 | ORIGINATING T SPAN | |
| PAY STN. PORT NUMBER | | ORIGINATING CHANNEL NO. | |
| CALL STATUS(BUSY/RNA) | 03　01 | DIALED NUMBER | |
| PREFERRED CARRIER CODE | | AUTHORIZATION CODE | |
| HOW SENT(PAID/CREDIT) | | PROJECT ACCOUNT CODE | |
| ACCOUNT NUMBER | | TIME DURATION | |
| AMOUNT | | | |

TOTAL LENGTH: MIN ▲　▼ MAX 21

SEPERATOR DELIMITER (Y/N)　　　　　　▲ N ▼
END DELIMITER　　　　　(Y/N)　　　　　▲ Y ▼
SENT/NON-SENT PAID CHARACTERS ▲　　　↕　　　▼　　GO TO SCREEN 2　　▲ ▼
BUSY/RNA CONDITION CHARACTERS ▲ 0　　↕　　1 ▼　　EXIT TO MAIN MENU　▲ ▼

↙ 133

FIG. 8A1 (IPUP1)

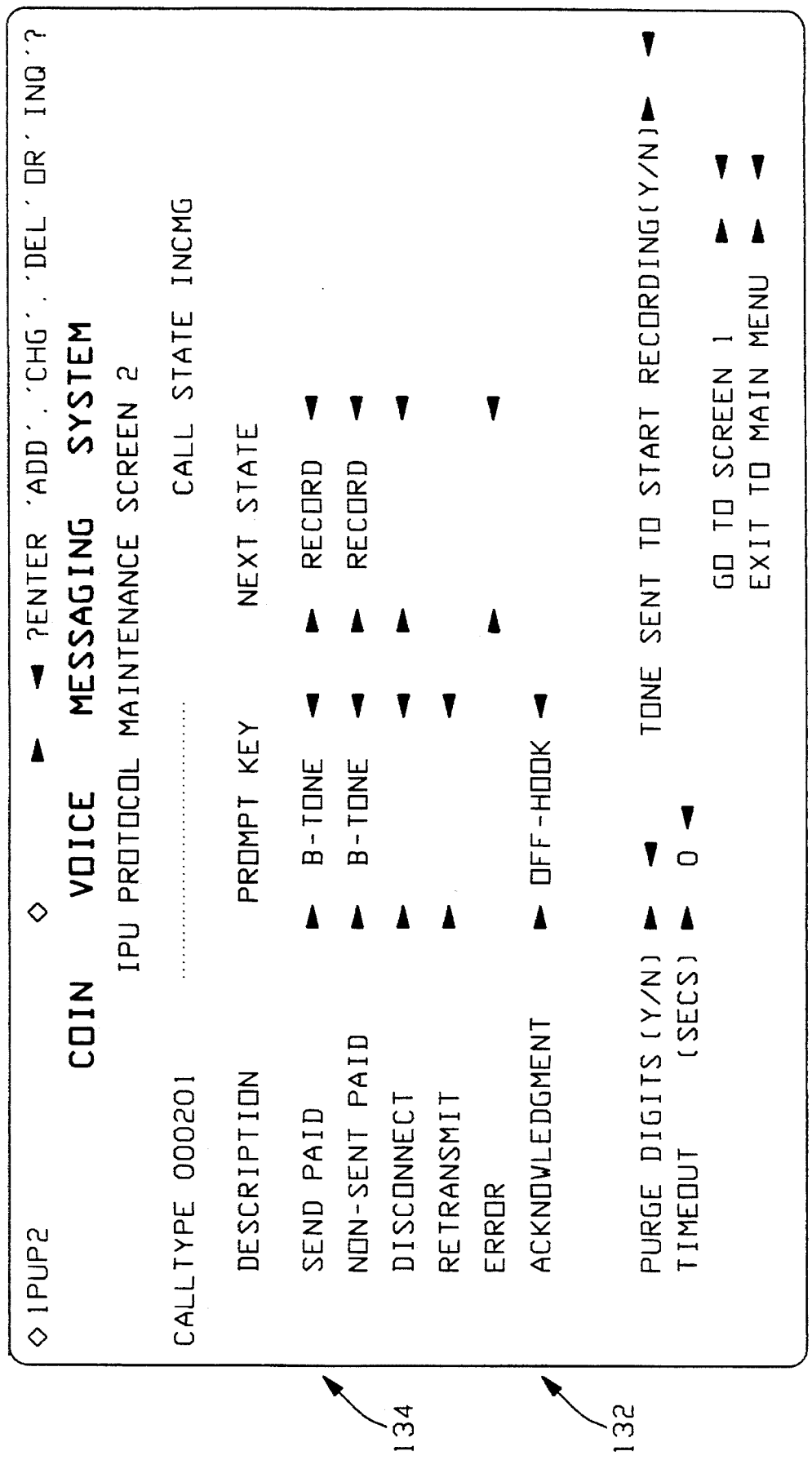
FIG. 8A2 (IPUP2)

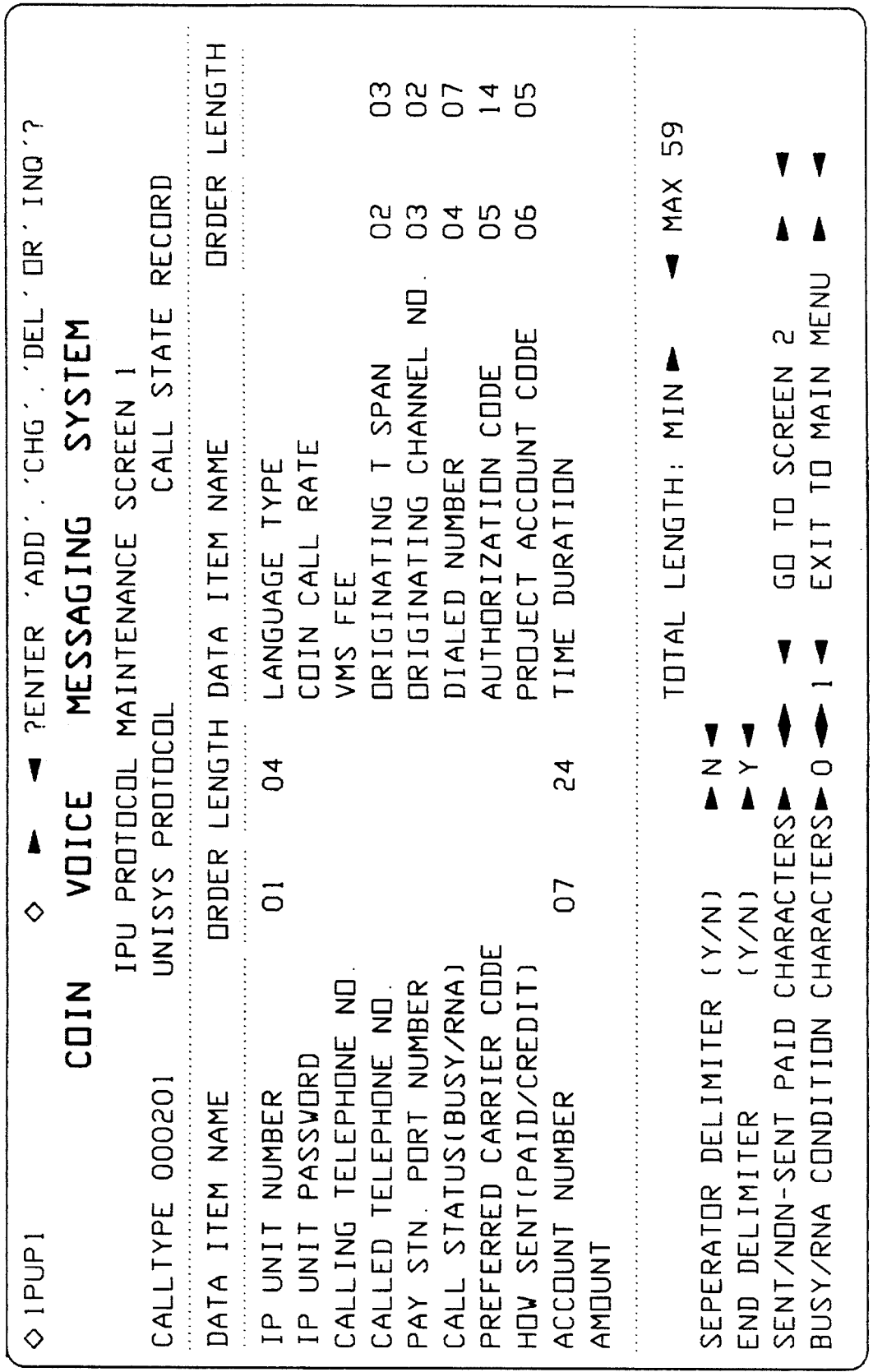
FIG. 8B1 (IPUP1)

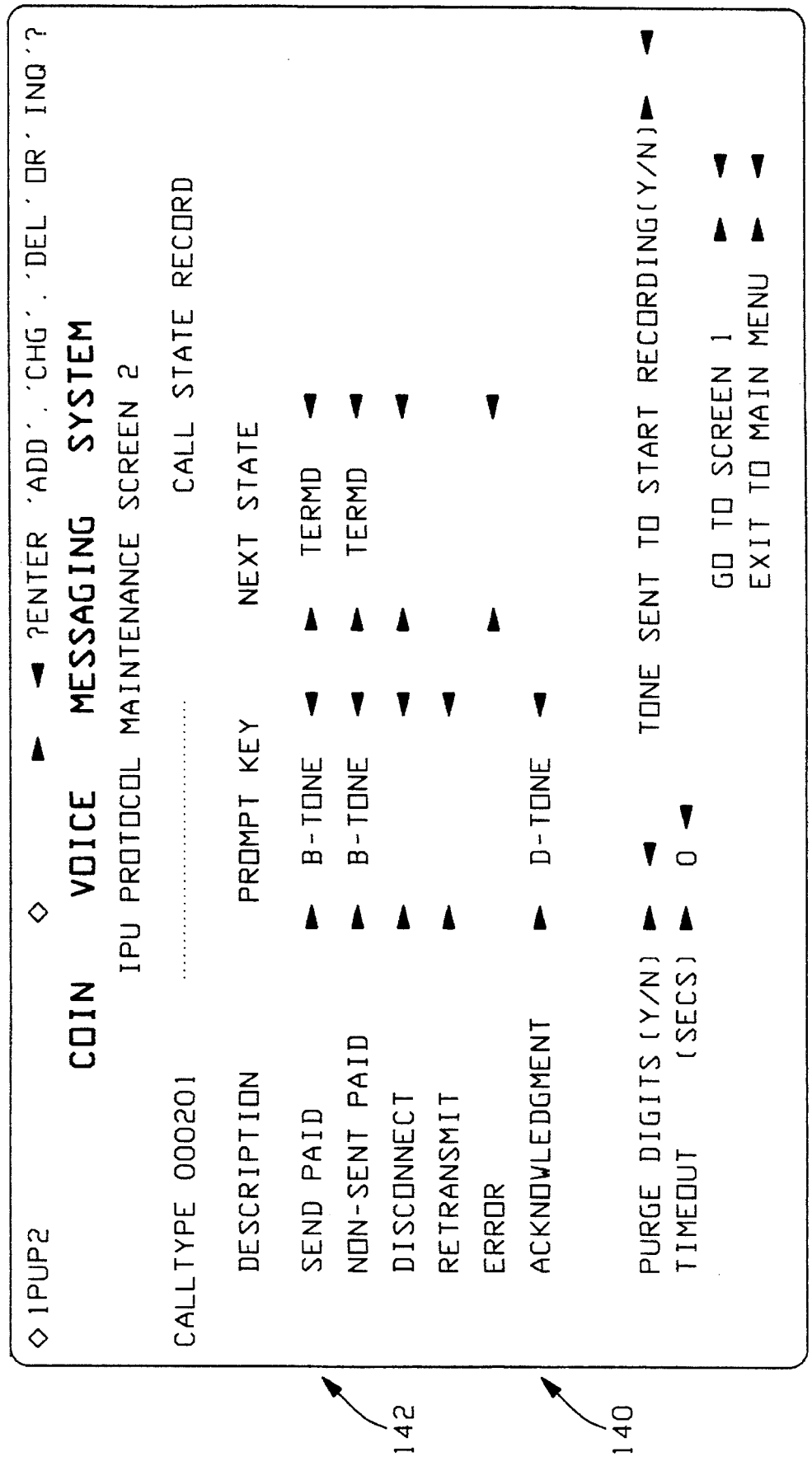
FIG. 8B2 (IPUP2)

METHOD AND APPARATUS FOR DEFINING PARAMETER TRANSMISSION PROTOCOLS FOR A CALL INTERCEPT/MESSAGE DELIVERY TELEPHONE SYSTEM

BACKGROUND OF THE INVENTION

1. Field of the Invention

The invention relates to voice messaging systems for use in telecommunication networks, particularly with respect to parameter transfer protocols between call intercept units and a message delivery system thereof.

2. Description of the Prior Art

Voice messaging systems are known where a call is intercepted upon detection of an incomplete call condition at the intended call destination. The system issues a prompt to the caller offering a voice store and forward service for caller acceptance. The incomplete call condition may, for example, be a busy or ring-no-answer (RNA) condition at the called telephone. Such systems normally include one or more Intercept Processing Units (IPU) and a Message Delivery System (MDS). The MDS is often referred to as a Voice Processing Subsystem (VPS). The IPU may be installed in the subscriber loops connecting the user telephones to the telephone company (telco) Central Office (CO), or the IPU may be installed in the digital links interconnecting the telco network switches. Alternatively, the IPU may be located at the telephone or functionality of the IPU may be incorporated in the telco switch. The MDS is normally connected by a trunk to either a telco switch or to the IPUs or both, depending on the configuration, and is accessible by either a dialed or dedicated connection. Systems of this type are described, for example, in U.S. Pat. Nos. 5,34,646; 5,036,533; 4,932,042; 4,901,341 and 4,766,604. Pending U.S. patent application Ser. No. 08/016,588, filed Feb. 10, 1993, also discloses such a system.

Call intercept/message delivery systems of the type described are particularly advantageous in pay telephone networks and are denoted as Coin Voice Messaging Systems (CVMS). In a CVMS system, the IPUs intercept calls from paystations and either route them to the normal telephone company network, or in the case of a busy signal or RNA at the distant phone, offer through voice prompts the service to store and forward a message. The prompts instruct the payphone customer to deposit coins to accept the service or to enter a designated key sequence if the call had been charged to accept the service. Acceptance of the service through coin insertion is referred to as "sent-paid" and entry of a calling card or charge card number is referred to as "non-sent-paid".

The IPU subsystem is commercially available from, for example, Cordell Manufacturing Inc. of Covina, Calif., as the Advanced Paystation Interface System (APIS) or from Science Dynamics Corporation of Cherry Hill, N.J., as the Coin Line Monitor Interceptor (CLMI). The MDS subsystem is a commercially procurable system available from numerous sources. For example, Unisys Corporation of Blue Bell, Pa., provides a unit denoted as the Unisys Voice Processing Subsystem (VPS). The VPS is available from Unisys Corporation in a personal computer (PC) version denoted as PC/Vips supported by a UNIX system host processor (UNIX is a trademark of AT&T). Unisys Corporation also provides a Network Applications Platform (NAP) to support the VPS functions with an appropriate resident application. Such an application is available from Unisys Corporation and is denoted as the Coin Voice Messaging System (CVMS). The NAP is described in U.S. Pat. No. 5,133,004, issued Jul. 21, 1992.

In the call intercept/message delivery system, the IPU intercepts the call on busy/ring-no-answer and the caller is offered the opportunity to record a message via the MDS. If the caller accepts the service, the IPU contacts the MDS and communicates call specific parameters such as called telephone number, calling telephone number, credit card numbers and the like over the connection usually utilizing DTMF digits and in accordance with a handshake protocol that is unique to each type of IPU. For example, different types of IPUs may be designed to deliver different strings of parameters in different orders utilizing different field formats. Additionally, the different types of IPUs may be designed to interchange protocol specific acknowledgments with the MDS during parameter transmission. Thus it is appreciated that the handshake protocols between different types of IPUs and the MDS may be different with respect to each other. After the handshake is successfully accomplished, the MDS prompts the caller for the message and then attempts to deliver the recorded message to the original called number.

The systems described have a number of disadvantages. The software of the MDS must be designed to support the particular parameter transfer protocol of the type of IPU in use at the time. Prior art systems generally operate with a single type of IPU at one time and would require software changes to accommodate different types of IPU. It is necessary to change the MDS program to accommodate different IPU types.

Older IPU designs do not collect and transmit a large number of digits to the MDS during the handshake. The IPU-to-MDS transmission can be completed in approximately two seconds. This delay prior to the MDS offering spoken instructions to the caller does not adversely affect the user acceptance of the service. Present day IPUs, however, can collect and transmit significantly more data than the previous designs. When an IPU transmits a large number of digits, the delay experienced by the caller before the caller can record the message would seriously affect user acceptance of the service. This delay is exacerbated since the MDS provides data validation and acknowledgment/negative acknowledgment of each interaction. The delay experienced by the caller after accepting the service offered by the IPU but before hearing the first instructions spoken by the MDS would be unacceptable in conventional user situations.

Systems of the type described tend to be expensive because of the requirement for programming modifications to accommodate different types of IPUs. Since present systems cannot concurrently interact with multiple IPU types, redundancy in resources, such as CPU and memory, is required to support multiple IPU types on a single computer. Such redundancy further increases the cost of the system.

SUMMARY OF THE INVENTION

The present invention obviates the above disadvantages of the prior art by providing a generic handshake protocol display into which protocol specifications can be entered for the specific IPUs of the system. The protocol specifications are stored and identifiable to the respective IPUs. In response to an incoming call, the MDS identifies the IPU type and utilizes the appropriate stored handshake protocol specifications. In this manner, various types of IPUs can be utilized without modifying the system software.

A split protocol is included, as entered into the generic protocol display and stored in the system, for transferring a first string of parameters between the IPU and MDS prior to the MDS issuing the message recording prompts to the caller and for transmitting a second string of parameters between the IPU and MDS after the recording session is completed. In this manner, the time is minimized between caller acceptance and the caller hearing the instruction prompts for recording the message.

BRIEF DESCRIPTION OF THE DRAWINGS

FIGS. 5A and 5B are illustrations of IPU Protocol Maintenance Screen 1 and IPU Protocol Maintenance Screen 2, respectively, accessed from the screen of FIG. 4 and including generic protocol definitions for entry of specific IPU protocol specifications in accordance with the invention.

FIGS. 8A1, 8A2, 8B1 and 8B2 are illustrations of IPU Protocol Maintenance Screens for entering the protocol specification of the protocol illustrated in FIG. 7.

DESCRIPTION OF THE PREFERRED EMBODIMENTS

Figure 1:
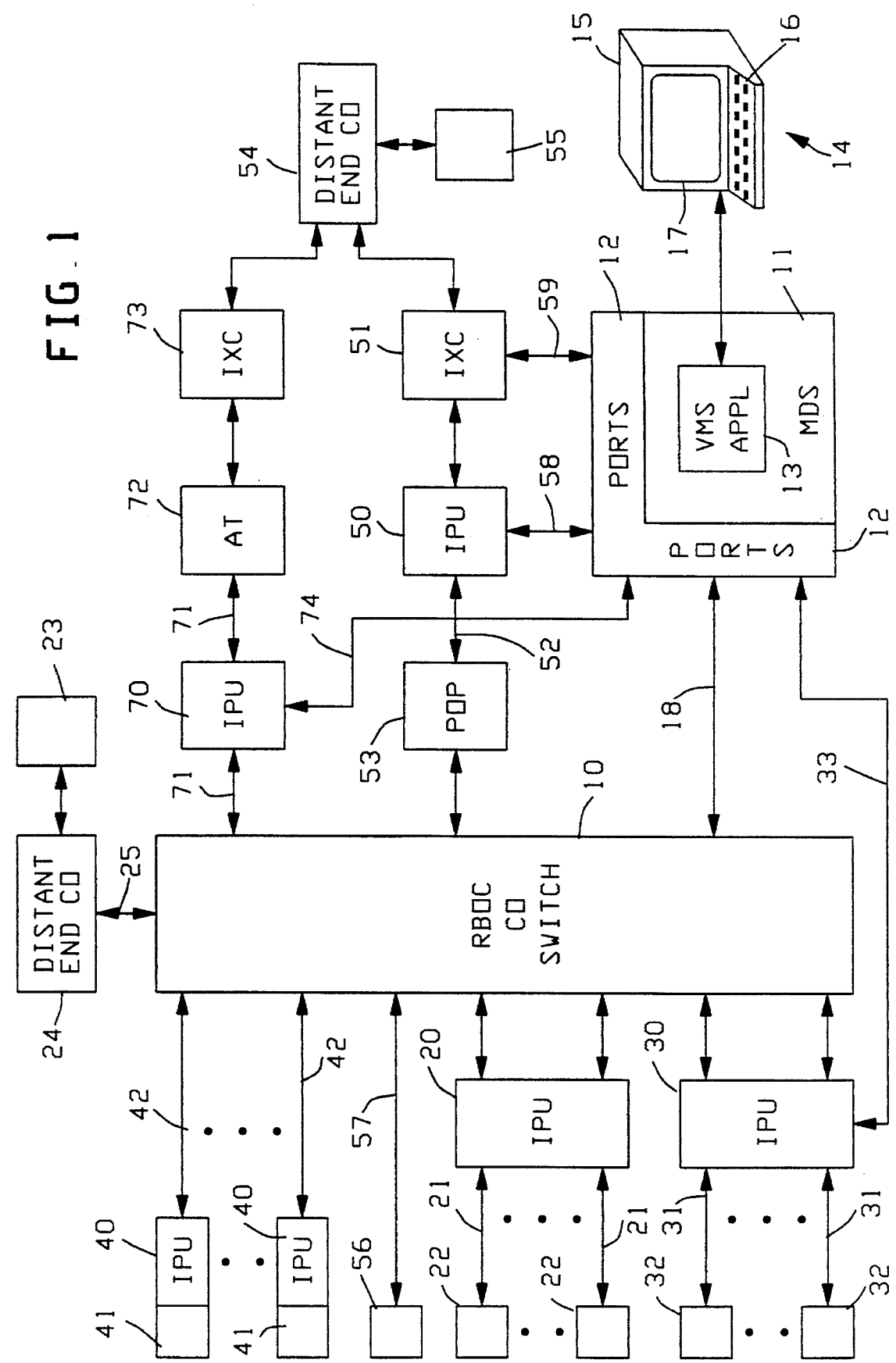
FIG. 1 is a schematic block diagram illustrating numerous architectures for a call intercept/message delivery telephone system.

Referring to FIG. 1, a portion of the telephone network with a call intercept/message delivery system installed is illustrated. FIG. 1 is a composite of different system architectures that may be utilized. In an actual installation not all of the illustrated configurations would be used. The system architectures will be described with respect to a Regional Bell Operating Company (RBOC) Central Office (CO) switch 10 and an MDS 11. Network connections to the MDS are effected via ports 12. The MDS 11 is controlled by a Voice Messaging System (VMS) application 13 details of which will be described below with respect to the present invention. In a Coin Voice Messaging System, the application 13 is denoted as CVMS. Details of a platform suitable for implementing the MDS 11 are illustrated in said U.S. Pat. No. 5,133,004 which is incorporated herein by reference. An MDS administration terminal 14 is illustrated including a display 15 and a keyboard 16.

In a manner to be described below, the terminal 14 is controlled by the application 13 and operated by, for example, the MDS administrator for entering specific IPU protocol specifications in response to generic protocol screens displayed by application 13 on display screen 17 of display device 15. The MDS 11 is coupled to the CO switch 10 through ports 12 via a trunk connection 18.

A system configuration denoted as "line-side" is implemented by IPUs 20 interposed in line connections 21 between telephones 22 and the CO switch 10. Conveniently, the IPUs 20 are installed at the RBOC CO on the line-side of the CO switch 10. A caller at a telephone 22 may, for example, be placing a call to a telephone 23 serviced by a distant end CO 24. The CO switch 10 and the distant end CO 24 are connected by an inter-office trunk 25. When the IPU 20 detects the busy or ring-no-answer (RNA) condition at the telephone 23, the IPU 20 issues an announcement to the caller that a voice message store and forward service is available for acceptance by the caller. If the caller accepts the service by entry of an appropriate acceptance indication, the connection to the telephone 23 is dropped and the IPU 20 dials the MDS 11 through the CO switch 10. The system is arranged and telephone numbers allocated to the ports 12 of the MDS 11 so that calls from an IPU 20 are connected through the switch 10 and the trunk 18 to predetermined ports 12 associated with the IPU(s) 20.

When the MDS 11 answers the call from the IPU 20, a parameter transfer handshake protocol is initiated during which the IPU 20 transfers call specific information to the MDS 11. The handshake protocol is specific to the type of IPU utilized in implementing the IPU 20. The protocol is configured and controlled, in accordance with the invention, in a manner to be described. Details of the system implemented by elements 10, 11, 18 and 20–25 may be found in U.S. Pat. No. 5,134,646 issued Jul. 28, 1992. The present invention may be utilized in the system of said U.S. Pat. No. 5,134,646 by implementing the teachings disclosed herein. Said U.S. Pat. No. 5,134,646 is incorporated herein by reference.

Another line-side arrangement may be implemented by IPUs 30 interposed in line connections 31 between telephones 32 and the CO switch 10. The IPUs 30 are of a different type from that of the IPUs 20 and utilize a different handshake protocol specification. The IPUs 30 communicate with the MDS 11 via a dedicated trunk connection 33 through predetermined ports of the ports 12 unique to the IPUs 30. Alternatively, the IPUs 30 can dial the MDS 11 through the CO switch 10 utilizing connections to ports 12 that are unique to the IPUs 30.

Another line-side architecture may be implemented by utilizing IPU retrofit kits 40, retrofitted into telephones 41 and interposed in line connections 42 between the telephones 41 and the CO switch 10. The IPUs 40 communicate with the MDS 11 by dialing through the CO switch 10 utilizing ports of the ports 12 unique thereto. The handshake protocol of the IPUs 40 is again different from that of the IPUs 30 and that of the IPUs 20.

Another system architecture, denoted as "trunk-side", may be implemented utilizing IPUs 50. The IPUs 50 intercept the digital trunks coupling an Inter-Exchange Carrier (IXC) 51 and the RBOC CO switch 10. The IPUs 50 are illustrated interposed in a digital trunk 52 connecting the IXC 51 with Point Of Presence (POP) 53 for the IXC 51. A distant end CO 54 serviced by the IXC 51 and a telephone 55 connected to the CO 54 are illustrated for completeness. A telephone 56 is also illustrated coupled by a line connection 57 to the CO switch 10. The IPUs 50 offer the voice store and forward service for interLATA calls placed, for example, between the telephones 55 and 56.

The IPUs 50 can communicate with the MDS 11 via a dedicated trunk 58. The communication is effected through ports of the ports 12 unique to the IPUs 50. The MDS 11 delivers deposited voice messages to intended recipients via the IXC 51 through a trunk 59. The IPUs 50 are of a different type from, and require a different handshake protocol than those of the IPUs 20, 30 and 40.

Another trunk-side architecture may be implemented by IPUs 70 interposed in inter-office trunk 71 between CO switch 10 and Access Tandem (AT) 72. The AT 72 serves as the POP for IXC 73. The IPU 70 communicates with the MDS 11 through a dedicated trunk 74 and dedicated ports of the ports 12. The MDS 11 delivers stored voice messages to intended recipients through the CO switch 10. Again, the IPUs 70 are of a different type from, and utilize a different handshake protocol than those of IPUs 20, 30, 40 and 50.

The configurations represented by IPUs 20, 30, 40 and 70 would be implemented by the RBOC owning the CO switch 10 to service calls originating in an RBOC LATA. Conveniently, the IPUs 20, 30 and 70 are installed at the RBOC CO with the IPUs 20 and 30 connected at the line-side of the CO switch 10 and the IPUs 70 connected at the trunk-side thereof. The IPUs 70 could also be installed at the AT 72. The configuration represented by the IPUs 50 would be installed by the IXC 51 to service calls transported thereby. The IPUs 50 would be conveniently installed t the switching office of the IXC 51.

Figure 2:
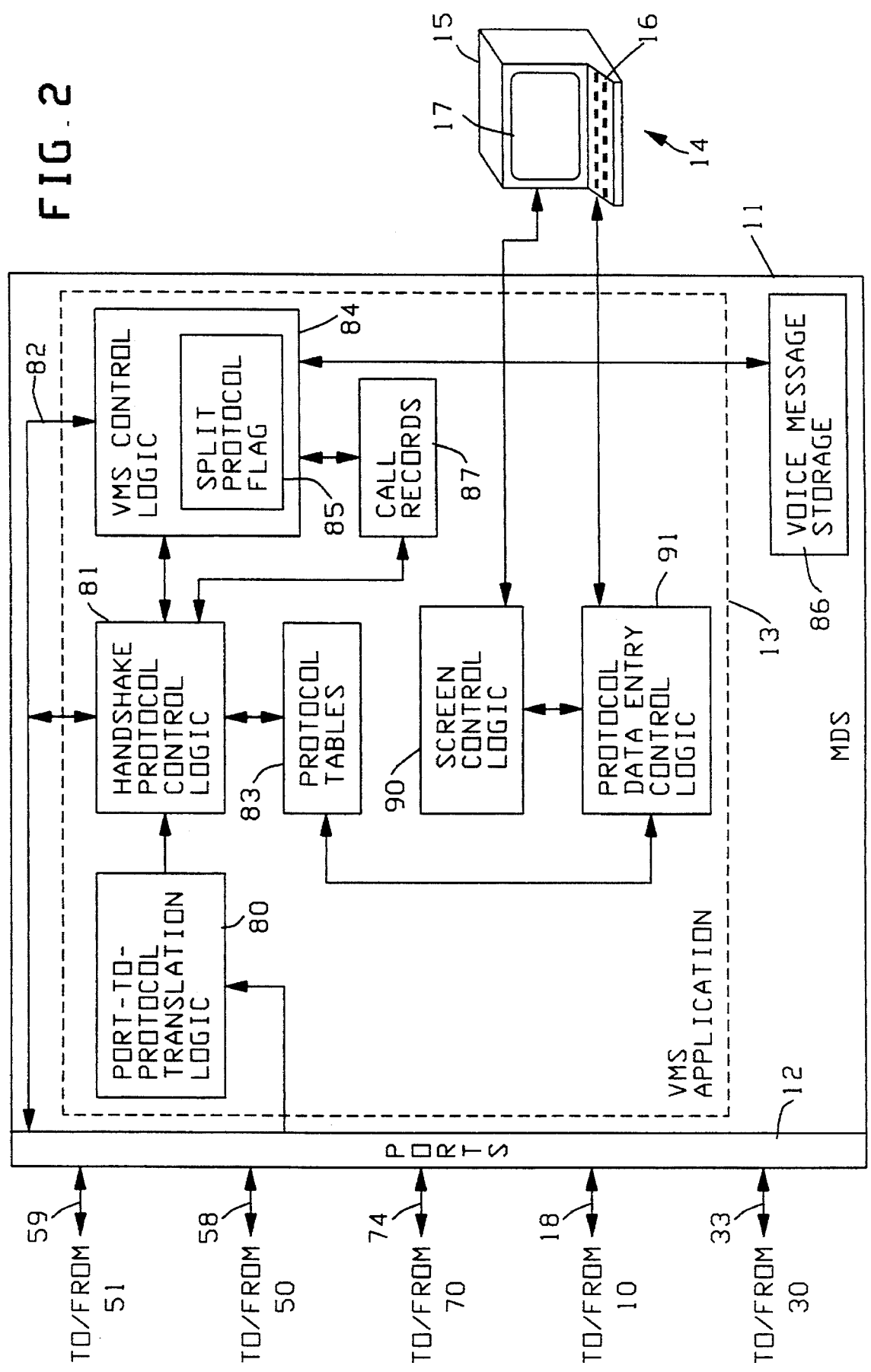
FIG. 2 is a schematic block diagram illustrating further details of the MDS of FIG. 1, particularly with respect to the Voice Messaging System (VMS) application.

Referring to FIG. 2, in which like reference numerals indicate like components with respect to FIG. 1, details of the MDS 11, particularly with respect to the VMS application 13, are illustrated. When a call arrives at the MDS 11, port-to-protocol translation logic 80 identifies the specific port of the incoming call and translates the port number to the appropriate protocol type for the IPU type that placed the call. In the preferred embodiments the protocol type is denoted as CALLTYPE. Each type of IPU device has its own CALLTYPE defined for it.

The port-to-protocol translation logic 80 provides the CALLTYPE to handshake protocol control logic 81 for controlling the handshake protocol between the IPU connected to the call and the MDS 11. As will be described in further detail below, the handshake involves the IPU transmitting call related parameters to the MDS 11 and the MDS 11 transmitting acknowledgment signals to the IPU. The protocol is performed by the logic 81 via a data and voice bus 82 connected to the port used by the call.

Since the handshake protocols for the different types of IPUs are different with respect to each other, the logic 81 consults protocol tables 83 keyed to CALLTYPE for the appropriate protocol specifications. The protocol tables 83 are also keyed by an index denoted as CALLSTATE to control the specific protocol sequencing in a manner to be described. The protocol can be arranged so that the entire string of parameters is transmitted by the IPU to the MDS 11 prior to recording the message from the caller. In accordance with the invention, however, a split protocol is implemented whereby a first parameter string is transmitted prior to the caller recording the message and a second parameter string transmitted thereafter. This novel split protocol is controlled by the logic 81 in conjunction with the protocol tables 83 in a manner to be described.

It is appreciated therefore, that the protocol tables 83 define for each CALLTYPE the particular parameters to be transmitted, the order of transmission, the length of the parameter fields, whether fields are fixed or variable, field separator delimiters and end delimiters, acknowledgments and prompts, and characters denoting sent-paid/non-sent-paid and busy/ring-no-answer condition. The protocol tables 83 also define the parsing of the parameter strings and define the string split for a split protocol.

The VMS application 13 includes VMS control logic 84 that provides overall control of the application functionality. The VMS control logic 84 includes a split protocol flag 85 set by the handshake protocol control logic 81 if the CALLTYPE designates a split protocol. During a split protocol, the logic 81 enters and performs the first portion of the protocol session and turns control over to the logic 84 for the message recording session. When the recording session is complete, the logic 84 returns control to the logic 81 to complete the protocol session. The logic 81 sets the flag 85 to inform the control logic 84 when in the recording session to return control to the protocol session.

When in the recording session, the VMS control logic 84 acquires the voice message from the caller via the bus 82 and stores the message in voice message storage 86. Voice message storage 86 also stores pre-recorded prompts to be played by the logic 84 to the caller via the bus 82.

The handshake protocol control logic 81 stores the call related information in call records 87. The VMS control logic 84 utilizes the call records 87 to deliver the messages held in voice message storage 86 to the intended recipients.

In accordance with the invention, the VMS application 13 includes screen control logic 90 for generating and displaying generic handshake protocol screens on the screen display 17 of the administration terminal 14. These screens prompt the administrator of the MDS 11 to enter the handshake protocol specifications for the various CALLTYPEs utilized by the IPUs of the system. The specification data is entered via keyboard 16. The VMS application 13 includes protocol data entry control logic 91 for receiving the protocol specification data from the keyboard 16 and entering the data in the appropriate protocol tables 83 in accordance with CALLTYPE. The administrator identifies CALLTYPE and enters the parameter defining information in accordance with the CALLSTATEs of the protocols in a manner to be further explained. The protocol tables 83 are keyed to CALLTYPE and CALLSTATE so that the logic 81 properly performs the appropriate protocols.

The preferred embodiment of the invention is explained in terms of a Coin Voice Messaging System (CVMS) and FIGS. 3, 4, 5A and 5B illustrate screens with respect thereto. These screens are utilized to access the handshake protocol control of the present invention and are generated on screen display 17 by screen control logic 90 of FIG. 2. Information entered into the screens by the user via the keyboard 16 are interactively written to the screens through the logic 90 and 91 of FIG. 2.

Figure 3:
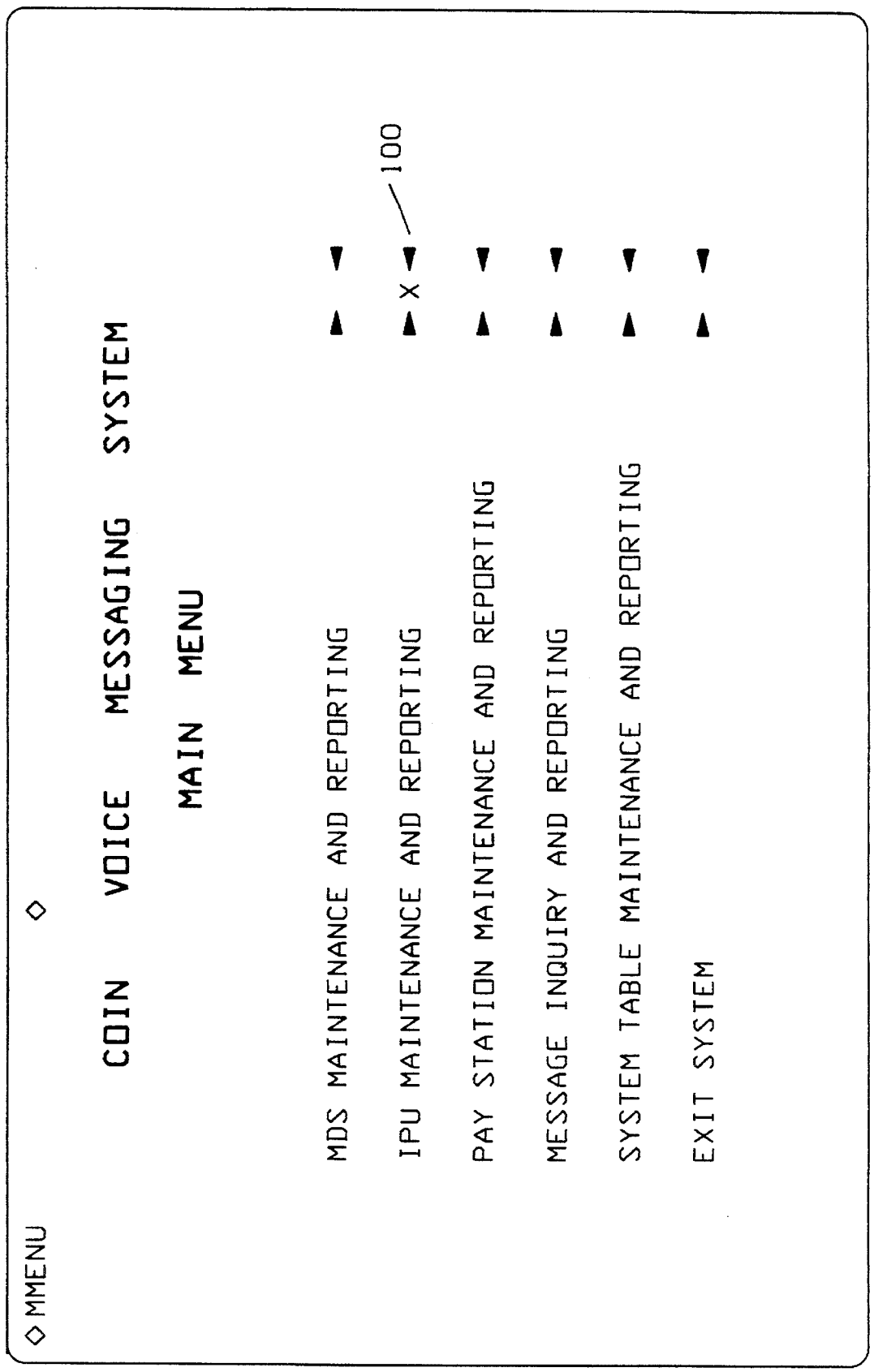
FIG. 3 is an illustration of a Main Menu Screen for accessing IPU maintenance.
Figure 4:
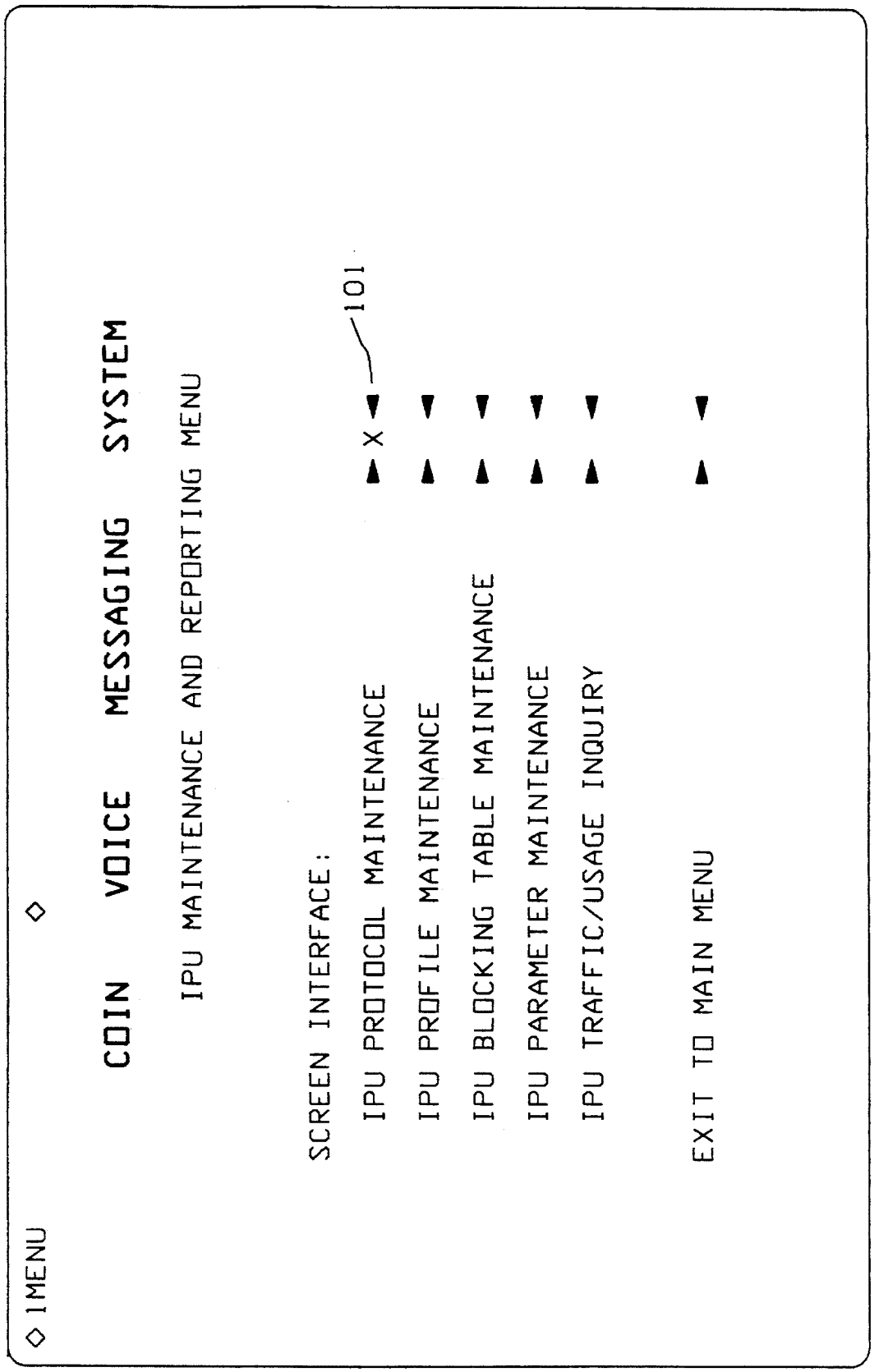
FIG. 4 is an illustration of an IPU maintenance screen for accessing IPU protocol maintenance in accordance with the invention.

Referring to FIG. 3, the Main Menu Screen for the CVMS system is illustrated. The IPU Maintenance and Reporting level is the second option in the Main Menu. This option is selected by typing an "X" between the delimiters, as indicated by reference numeral 100, and then pressing TRANSMIT on the keyboard 16. This displays the IPU Maintenance and Reporting Menu as illustrated in FIG. 4. The first option in the IPU Maintenance and Reporting Menu is IPU Protocol Maintenance and is selected by entering an "X" between the delimiters, as indicated by reference numeral 101, and pressing TRANSMIT. Selecting this option displays the first of the IPU Protocol Maintenance Screens.

There are two IPU Protocol Maintenance Screens denoted as IPUP1 and IPUP2 as illustrated in FIGS. 5A and 5B, respectively. The two screens IPUP1 and IPUP2 are utilized to customize the generic IPU protocol of CVMS to match the requirements of the IPU devices used in the system. The screens IPUP1 and IPUP2 should be considered as logical continuations of each other. The protocol to be handled by the IPU and the VMS system varies with each kind of IPU device used. The generic protocol of the present invention manages protocols of various types of units.

As discussed above with respect to FIG. 2, the protocol tables 83 are keyed on CALLTYPE and CALLSTATE. The CALLTYPE names and defines the particular protocol to be performed by the application 13 for the type of IPU that has called the MDS 11. The CALLSTATE defines the sequential states of the system in executing the protocol.

The state is a logical point in the program execution. A state defines precisely what actions are required to be taken within that state. In the VMS application 13, the state represents the processing of a parameter string sent by the IPU device. This includes such action as acknowledging the receipt of digits, validating parameters, handling errors, and playing tones to indicate that the system is ready to receive more digits. Normally, the state can be given any name by the user. However, there are four special states whose names are fixed which are states where special action is taken by the system. The INCMG state is the state of an incoming call. The TERMD state is the state where a dialogue is terminated. The state DONE indicates a state where the protocol session is completed and the system goes into the recording session. The RECORD state is the state where the protocol is not completed but control goes over to the recording session. In this case, control returns to the protocol session after the recording session is completed. The RECORD state is utilized to implement the split protocol of the present invention. User-defined states (states other than the special states) indicate that a string of parameters will be sent by the IPU in that state.

Referring to FIG. 5A, the IPUP1 screen is illustrated and provides a generic definition of all of the parameters that may be passed by an IPU to the MDS 11 for the various protocols that can be handled by the system. The CVMS system can interface to many types of IPU devices having different protocols. The MDS 11 is configured so that each type of device with a different protocol has a different CALLTYPE. As described above with respect to FIG. 2, CVMS utilizes the CALLTYPE of the incoming call to determine the correct protocol for the device.

The IPUP1 screen is utilized to name and enter CALLTYPE and CALLSTATE. The screen is also utilized to enter the order of the fields and the maximum length of each field within a parameter string sent by an IPU in accordance with the named CALLTYPE protocol during each named CALLSTATE thereof. The fields can be of variable length, separated by delimiters, or of fixed length. The name of each parameter is displayed on the IPUP1 screen together with the order of the parameter within the string and the length of the parameter field. These values are entered into IPUP1 by the system administrator utilizing the keyboard 16, as described above with respect to FIGS. 1 and 2. Entries are made with respect to the parameters of the data string to be sent during the named CALLSTATE of the named protocol CALLTYPE. The order and length designations are left blank or zero for parameters not passed in the named CALLSTATE and CALLTYPE.

In other words, the IPUP1 screen illustrates possible fields that can be passed as parameters from an IPU to the MDS 11 in performing the handshake protocol, the names of the fields appearing on the screen. All of the fields illustrated may not be present in a particular parameter string passed by an IPU. The Order field on screen 1 represents the order in which the fields appear in the parameter string and is utilized to enter the order of appearance of the named parameter in the parameter string. The Length field is utilized to enter the maximum length of the named parameter. If the Order field for a parameter name is blank or zero, then the field is not selected for the string to be transmitted in the named CALLSTATE of the named protocol.

The IPUP1 screen also includes a Separator Delimiter field which can be set to Yes or No (Y/N). If the Separator Delimiter field is set to Y, the fields are of variable length and are separated by delimiters. Otherwise, the fields are of fixed length. A default delimiter such as the DTMF digits "#" or "*" is defined by the system and required by all of the IPUs. Alternatively, the logic 81 and 91 and tables 83 (FIG. 2) can be arranged so that the administrator can enter the delimiter character utilized to separate the parameters in accordance with the protocol being defined.

In a similar manner, an End Delimiter field is included for entry of Yes or No (Y/N). The End Delimiter should be Y for variable length parameters and may be Y or N for fixed length fields. In a manner similar to that described with respect to the Separator Delimiter, a default value can be utilized by the system or, alternatively, the End Delimiter field can be utilized to enter a delimiter character used to indicate the end of a set of parameters in accordance with the protocol being defined.

The Separator Delimiter and the End Delimiter are utilized to set the digit rules for collecting the DTMF tones from the IPU. Digit rules are discussed in detail in said U.S. Pat. No. 5,133,004. For example, as described in said U.S. Pat. No. 5,133,004, a delimiter list is provided by the application to inform NAP to stop collecting DTMF digits when a delimiter on the delimiter list is received by NAP.

The busy/RNA condition and the Sent Paid/Non-Sent Paid fields are one-character fields. The values of these fields should be defined on the screen for the system to recognize the Busy or RNA condition and if the call is sent paid or non-sent paid. The sent paid and non-sent paid fields comprise one-character each which will indicate a sent paid or a non-sent paid call, respectively. The busy and RNA condition fields comprise one-character each which indicates a busy or RNA condition, respectively.

The Total Length entries provide fields for defining the total length of the IPU handshake protocol parameters of the string designated on the displayed IPUP1 screen for the named CALLTYPE and CALLSTATE. The MIN field is utilized to enter the minimum length of the parameter string and the MAX field is utilized to enter the maximum length of the parameter string.

The Exit To Main Menu item is utilized to return to the Main Menu screen of FIG. 3. The Go To Screen 2 item is utilized to bring up screen 2 of the named CALLTYPE and CALLSTATE.

It is appreciated that the parameters displayed on IPUP1 are representative but not limiting. Other parameters may be included in the generic parameter display thereof if the parameter is included in an IPU type contemplated for use in the system.

Most of the parameter names illustrated are self explanatory. Briefly, however, the IP Unit Number is a numerical designation given to the particular IPU in the system and the IP Unit Password is a password given to the IPU. The Calling Telephone No. is the telephone number of the station from which the call originated and the Called Telephone No. is the telephone number of the intended recipient of the message. The Called Telephone No. may not be the number entered at the station by the caller. For example, the caller may dial an 800 number which is translated to the intended recipient's telephone number. Provision for the actual number dialed is included in the generic protocol list as Dialed Number. The Pay Stn. Port Number is the numerical identification of the IPU port of the incoming call and the Call Status field provides a numerical designation of whether the call was incomplete because of a busy or RNA condition. The Preferred Carrier Code is utilized for the long distance carrier preferred by the caller for delivering the message as compared to the default carrier subscribed to by the MDS. This field is applicable to non-sent paid calls where the caller utilizes a credit card of a particular IXC. The How Sent field provides a numerical designation of how the call was sent; i.e., paid or credit. The Account Number, Amount, Authorization Code and Project Account Code fields relate to non-sent paid calls utilizing credit cards or special authorization dialing sequences. The Language Type refers to the language in which the IPU expects the spoken prompts to the caller from the MDS 11 to be delivered. The Coin Call Rate is utilized for the rate charged at the pay telephone by coin deposit for the message delivery service with respect to sent paid calls. The VMS Fee is the rate charged for the VMS service for non-sent paid calls. The Originating T Span and Originating Channel No. parameters are utilized for trunkside IPU installations to denote the T span and channel of the incoming call. The Time Duration parameter relates to the total time duration of a call.

When an "X" is transmitted from the Go To Screen 2 field, the screen control logic 90 (FIG. 2) brings up the IPUP2 screen illustrated in FIG. 5B.

Referring to FIG. 5B, the IPUP2 screen defines the prompts and the sequence of events that should take place to continue to the next state, or defines the next action that should occur. Specifically, the IPUP2 screen defines the action to be taken on receiving a parameter string. The Prompt Key on the screen specifies the prompt that should be played when the condition shown beside it occurs. For example, the Sent Paid prompt or the Non-Sent Paid prompt is played for sent paid or non-sent paid calls, respectively, after the parameter string defined in the corresponding IPUP1 screen is processed error free. If an error occurs, the Retransmit prompt is played and the system remains in the current state. If, however, an error occurs and the Retransmit Prompt Key is blank, the system will go to the Error state indicated on the screen. If the Error Next State is blank and an error occurs, the Disconnect prompt specified by the Disconnect Prompt Key is played and the call is terminated.

The Acknowledgment prompt is played by the application 13 (FIG. 2) to acknowledge to the IPU that actions that should occur in the current state have been properly executed. For example, in the INCMG state the Acknowledgment prompt indicates to the IPU that the call was connected properly. In the RECORD state the Acknowledgment prompt indicates to the IPU that the recording session has been properly performed and completed.

The Next State field indicates the next action that the system will be taking from the current state. INCMG, TERMD, DONE, and RECORD are states previously described where special actions are taken by the system. Generally, the Acknowledgment prompt is played to indicate to the IPU that the current state is in effect and that the parameter string defined by the corresponding IPUP1 screen can be transmitted. Upon successful transmission of the parameter string, the Sent Paid or Non-Sent Paid prompt is played as appropriate to the call and the system enters the next CALLSTATE of the CALLTYPE protocol in accordance with the next state named in the appropriate Next State field. The Sent Paid or Non-Sent Paid prompt acknowledges to the IPU that the parameter string was successfully received.

It will be appreciated that different Prompt Keys and different Next States may be entered in a screen for the sent paid and non-sent paid entries so that different actions can be taken for sent paid and non-sent paid calls. For example, the INCMG state may define a parameter string common to both sent paid and non-sent paid calls. The next state may be a user defined state for receiving further parameters and defining different actions to be taken depending on whether the call is sent paid or non-sent paid. The Sent Paid Prompt Key and Sent Paid Next State may be appropriate for entering the recording session. The Non-Sent Paid Prompt Key and Non-Sent Paid Next State may be appropriate for entering a further user defined state for receiving additional parameters, such as Account Number, peculiar to the non-sent paid call, and then entering the recording session.

Specifically with respect to the fields of IPUP2, the CALLTYPE and CALLSTATE are as described above with respect to IPUP1 and the same information is entered as for a corresponding IPUP1 screen. The Sent-Paid Prompt Key indicates the next prompt to be played if the call is a sent paid call and the current state is as indicated by CALLSTATE. The Sent Paid Next State indicates the next state if the current state is as indicated by CALLSTATE and the Prompt Key is appropriate to Sent Paid. The Non-Sent Paid Prompt Key indicates the next prompt to be played if the call is a non-sent paid call and the current state is as indicated by CALLSTATE. The Non-Sent Paid Next State indicates the next state if the current state is as indicated by CALLSTATE and the Prompt Key is appropriate to Non-Sent Paid. The Disconnect Prompt Key indicates the next prompt to be played if the call is to be disconnected and the current state is as indicated by CALLSTATE. The Disconnect Next State indicates the next state if the current state is as indicated by CALLSTATE and the Prompt Key is appropriate to Disconnect. The Retransmit Prompt Key indicates the next prompt to be played if the parameters have to be retransmitted and the current state is as indicated by CALLSTATE. For Retransmit the system remains in the current state. The Error Next State indicates the next state if the current state is as indicated by CALLSTATE and the Prompt Keys are appropriate to entering the Error state. The Acknowledgment Prompt Key indicates the acknowledgment prompt to be played in response to completing an action to be taken during the current state. For example, in the INCMG state the designated acknowledgment prompt is played when an incoming call is connected.

IPUP2 further includes fields for Purge Digits (Y/N), Timeout and Tone Sent To Start Recording (Y/N). The Purge Digits field indicates whether the digits are to be purged for the call state indicated by CALLSTATE. The Timeout field indicates the timeout in seconds for the IPU digit input. The Tone Sent To Start Recording field indicates whether the IPU device will send a tone for the system to start the recording session.

The generic IPU protocol has been designed to accommodate the numerous variables associated with different IPU types. Each type of IPU device has its own defined CALLTYPE. The IPU protocol tables 83 (FIG. 2) are established for the IPUs of the system in accordance with the information entered into the IPUP1 and IPUP2 screens as described. The keys to the tables are the CALLTYPE and the CALLSTATE. An incoming call has a call state of INCMG. The system accesses the tables based on the call type and call state and determines what acknowledgment prompt to play, how to parse the incoming parameters and the next state to which to go. If the next state is RECORD or DONE, then the system enters the recording session to record the message of the caller. If the next state was RECORD, the system sets the split protocol flag 85 (FIG. 2) to go back into the protocol handling session in accordance with the split protocol of the present invention. If the next state is a user defined state (other than RECORD or DONE), then the system enters the call state to wait for a new string of parameters.

After the message is recorded, the system checks the flag 85 to determine if re-initiation of the handshake protocol with the IPU is required. If so, the system accesses the IPU table of the named CALLTYPE with CALLSTATE equal to RECORD and plays the acknowledgment prompt. This action re-initiates the protocol session with the IPU to transfer the remainder of the parameters therefrom.

Figure 6:
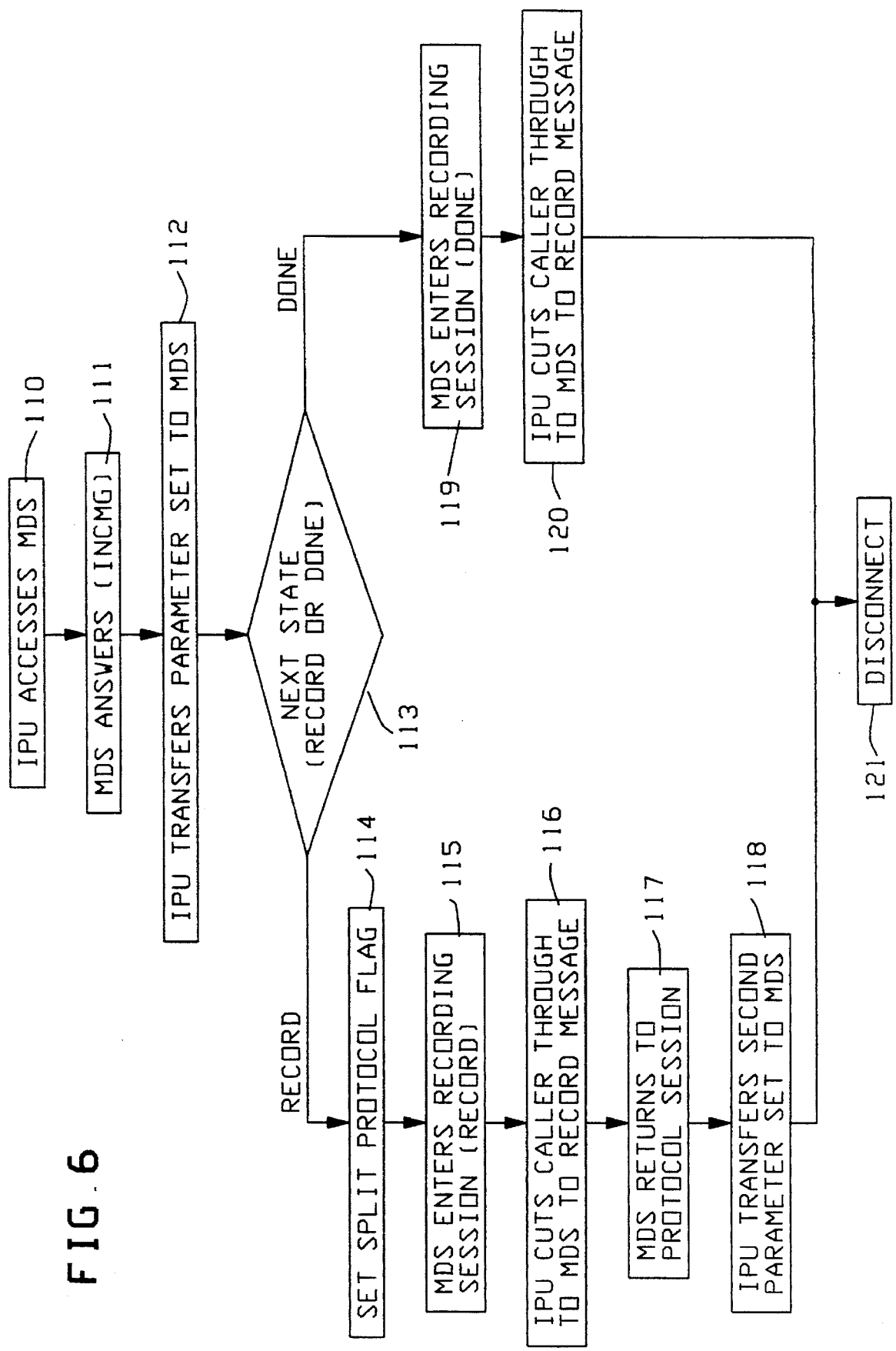
FIG. 6 is a flow chart illustrating operation controlled in accordance with a split protocol and a non-split protocol.

Referring to FIG. 6, a flow chart of operations performed in accordance with the invention is illustrated. The flow chart of FIG. 6 assumes that the caller has accepted the service. The IPU accesses the MDS 11 pursuant to a block 110. At a block 111 the MDS 11 answers the IPU and the system enters the INCMG state. In the INCMG state, the IPU transfers a parameter set to the MDS 11 pursuant to a block 112. In a split protocol, in accordance with the invention, the parameter set transferred during execution of block 112 is a first parameter set. In a one-pass handshake protocol where the parameters are transferred prior to entering the recording session, the parameter set transferred pursuant to block 112 is the complete set.

At an appropriate point in the protocol, a determination is made pursuant to a block 113 whether the next state is RECORD or DONE. If the next state is RECORD, the split protocol flag 85 is set pursuant to a block 114 and the MDS 11 enters the recording session pursuant to a block 115. The IPU cuts the caller through to the MDS 11 to record the message pursuant to a block 116. In response to testing the split protocol flag 85, the MDS 11 returns to the protocol session pursuant to a block 117 so that the IPU can transfer the second parameter set thereto pursuant to a block 118.

If the determination of block 113 is DONE, the MDS 11 enters the recording session pursuant to a block 119 and the IPU cuts the caller through to the MDS 11 to record the message pursuant to a block 120.

Thereafter, block 118 and 120 flow to a disconnect block 121 to terminate the call and the dialogue.

Figure 7:
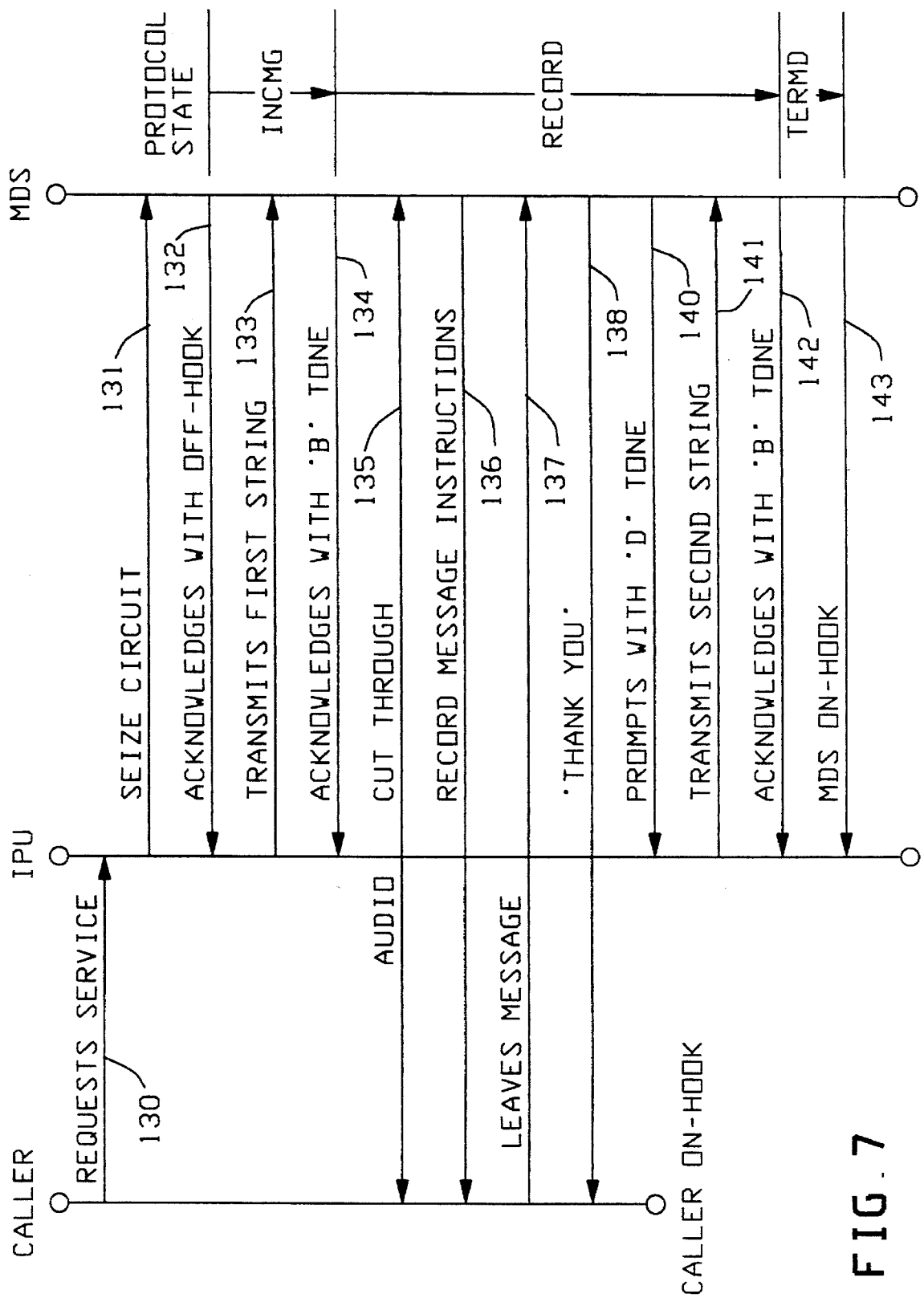
FIG. 7 is a chart of a split protocol between the IPU and MDS.

Referring to FIG. 7, a particular split protocol handshake is illustrated. The information strings sent by the IPU to the MDS 11 pursuant to the protocol of FIG. 7 are assumed to comprise two fixed field lengths strings representing information about the call. The first string to be transmitted is of length 21 and the second string to be transmitted after the voice message to be recorded is sent is comprised of 59 DTMF codes.

As indicated by a reference numeral 130, the caller sends the voice messaging service request to the IPU. In response thereto, the IPU seizes a circuit to the MDS 11 as indicated by reference numeral 131. As indicated at reference numeral 132, the MDS 11 enters the INCMG state and returns an off-hook acknowledgment to the IPU. After receiving the off-hook acknowledgment from the MDS 11, the IPU transmits the first parameter string to the MDS 11 in accordance with reference numeral 133. The first string comprised of 21 DTMF digits may consist of the following parameters, in the following order, with the following field length:

Calling Number (10 digits);
Called Number (10 digits);
Call Status (1 digit)(BY=0, RNA=1).

The calling number may be obtained from the Automatic Number Identification (ANI). The MDS 11 accepts the first string by sending a DTMF "B" acknowledgment to the IPU pursuant to reference numeral 134. After transmitting the "B" tone acknowledgment, the MDS 11 enters the next state of RECORD. At this time, the MDS 11 sets the split protocol flag 85 (FIG. 2).

In the RECORD state, control is transferred to the recording session and an audio path is cut through between the caller and the MDS 11 as indicated by reference numeral 135. The MDS 11 then prompts the caller for the message as indicated by reference numeral 136 and the caller leaves the message pursuant to reference numeral 137. As seen in FIG. 2, the message is recorded by the VMS control logic 84 in the voice message storage 86. At the completion of the recording session, signified, for example, by the caller either pressing the # key or silence time-out detected by the MDS 11, the MDS 11 sends a "Thank you" prompt to the caller via the IPU as indicated by reference numeral 138. Since the split protocol flag 85 (FIG. 2) has been set, control returns to the protocol session in the RECORD state. The handshake protocol control logic 81 (FIG. 2) consults the appropriate protocol table and, in accordance therewith, the MDS 11 prompts the IPU with a DTMF "D" tone to send the second string. Reference numeral 140 denotes the "D" tone acknowledgment.

When the IPU detects the DTMF "D", it transmits the second parameter string to the MDS 11 pursuant to reference numeral 141. The second string comprised of 59 DTMF digits may consist of the following parameters, in the following order, with the following field lengths;

IP Unit Number (4 digits);
Originating T Span (3 digits);
Originating Channel Number (2 digits);
Dialed Number (7 digits);
Authorization Code (14 digits);
Project Account Code (5 digits);
Credit Card Number (24 digits).

If the second string parameters are transmitted without error, the MDS 11 sends a DTMF "B" tone acknowledgment to the IPU as indicated by reference numeral 142. The MDS 11 enters the next state TERMD in which the MDS 11 goes on-hook as indicated by reference numeral 143.

After the handshake protocol is performed, the caller has recorded, at the MDS 11, the message to be delivered and the MDS 11 has gone on-hook. The MDS 11 thereafter attempts to deliver the message to the intended recipient. The MDS 11 utilizes the logic 84 to deliver the message pursuant to the call data in the call records 87 (FIG. 2).

Referring to FIGS. 8A1, 8A2, 8B1 and 8B2, examples of screens IPUP1 and IPUP2 for specifying the protocol described above with respect to FIG. 7 are illustrated. FIGS. 8A1 and 8A2 illustrate IPUP1 and IPUP2, respectively, for the INCMG state of the protocol. FIGS. 8B1 and 8B2 illustrate IPUP1 and IPUP2, respectively, for the RECORD state of the protocol. The reference numerals shown to the left of the screens point to the screen entries corresponding to the similarly identified protocol elements of FIG. 7.

It is appreciated that the protocol described above with respect to FIG. 7 can be implemented utilizing the IPUP1 and IPUP2 screens in a manner different than that illustrated in FIGS. 8A1–8B2. For example, a user defined state following the RECORD state can be utilized to define the second string. The screens defining the RECORD CALLSTATE would designate this user defined state as the Next State on the appropriate IPUP2 screen.

Although in FIGS. 8A1–8B2 the actual prompts to be transmitted (off-hook, B-tone, D-tone) are entered in the screens, it is appreciated that generic system names for prompts may preferably be entered. For example, such prompts as HND DONE, HND PARAM1, HND PARAM2 and HND PARAM3 may be entered in the screens. These Prompt Keys are Request OK To Record; Request Parameters 1; Request Parameters 2; and Request Parameters 3, respectively. The HND PARAM prompts would be utilized to initiate transfer of three different parameter strings. The system would then translate these Prompt Keys stored in the protocol tables 83 into the appropriate tones and signals for the particular IPU protocol in accordance with the incoming port 12 of the call. This translation architecture is described in said U.S. Pat. No. 5,133,004.

The present invention described herein permits an MDS administrator to specify the various handshake protocols utilized to communicate between an MDS and a variety of IPU types without reprogramming. Therefore, it is not necessary to alter the MDS program software to accommodate different types of IPU. Multiple types of IPUs can be concurrently accommodated by one MDS. The flexible protocol definition of the present invention decreases costs by eliminating the need for programming. The present invention further reduces costs because the concurrent interaction with multiple IPU types minimizes resources (CPU, memory) required to support multiple IPU types on a single computer in prior designs.

When an IPU transmits large numbers of digits during the handshake protocol, the split protocol of the present invention minimizes the delay experienced by the caller before recording the message. Minimizing the initial delay increases caller acceptance of the message delivery service. The protocol control of the present invention allows the IPU-to-MDS interaction to be split into start-of-call and end-of-call transmissions in order to minimize the delays. The split protocol of the present invention addresses the potential delay that would be caused by transmitting all data at the beginning of the call to the MDS. The split protocol minimizes the delay experienced by the caller after accepting the service and hearing the first instructions spoken by the MDS. In the split protocol, those parameters that are required by the system prior to the recording session can be appropriately transmitted at that time in the first string. Such a parameter may, for example, be Call Status (Busy/RNA) so that the system can play the appropriate prompts to the caller.

Although the above-described embodiments were explained in terms of multiple IPU types in the same system, it is appreciated that the invention is applicable to a system initially designed for one IPU type. In such a system, the generic protocol control is utilized to accommodate modifications and expansions to additional IPU types. Furthermore, the split protocol of the present invention is utilized in these arrangements to advantage.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a Voice Messaging System (VMS) for use in a telecommunication system, said VMS including a plurality of Intercept Processing Units (IPU) and a Message Delivery System (MDS), each said IPU transferring call related parameters to said MDS in accordance with a handshake protocol therebetween, said VMS system being adapted to include IPUs of different types, said handshake protocols of said different IPU types, respectively, being different with respect to each other; generic handshake protocol apparatus comprising screen display means for displaying generic protocol screens into which information can be entered to identify and define each said handshake protocol, thereby providing a protocol identification and definition for each said handshake protocol, said protocol identifications being associated with said different IPU types, respectively, means for entering said information into said screens, protocol storage means for storing said protocol definition for each said handshake protocol of each said different IPU type, said protocol definition of each handshake protocol being keyed by said protocol identification of the associated IPU type, and protocol control means in said MDS for performing a particular handshake protocol with an IPU that has called said MDS, said particular handshake protocol being selected from said protocol definitions stored in said protocol storage means by keying said protocol storage means in accordance with said protocol identification associated with said calling IPU.

2. The apparatus of claim 1 wherein each said protocol definition includes at least one string of specific call related parameters to be transferred from an IPU to said MDS, each of said specific call related parameters having an ordered location in said string and a field length associated therewith, said screen display means being operative for displaying said generic protocol screens with a generic list of call related parameters, including said specific call related parameters, each of said call related parameters of said generic list having an order entry location and a length entry location associated therewith on said screens for entering said ordered location in said string and said field length of each of said specific call related parameters of said string.

3. The apparatus of claim 2 wherein said screen display means is operative for displaying said generic protocol screens with screen locations for entering information regarding delimiter characters separating fields of said parameters in said string.

4. The apparatus of claim 1 wherein each said IPU is operative for intercepting calls placed in said telecommunication system that are busy or do not answer, said screen display means being operative for displaying said generic protocol screens with screen locations for entering information that will identify if a call is busy or did not answer and information that will identify the type of call placed.

5. The apparatus of claim 2 wherein each said IPU is operative for intercepting calls placed in said telecommunication system, each said handshake protocol being performed in successive states, said screen display means being operative for displaying said generic protocol screens with screen locations for entering information designating a current state and information designating a next state in accordance with various conditions of said calls.

6. The apparatus of claim 5 wherein said screen display means is further operative for displaying said generic protocol screens with screen locations for entering information identifying signals to be sent by said MDS to an IPU during said current state in accordance with said various conditions of said calls.

7. The apparatus of claim 1 wherein each said IPU is operative for intercepting calls placed by a caller to a called telephone in said telecommunication system, said VMS includes a service for delivering a voice message to said called telephone recorded by said caller in the event of an incomplete call, said voice message being recorded in said MDS during a recording session, at least one said handshake protocol being a split protocol with said handshake protocol definition thereof including first and second strings of specific call related parameters to be transferred from an IPU to said MDS during a protocol session, said screen display means being operative for displaying said generic protocol screens with screen locations for entering information to identify and define said split protocol, thereby providing a split protocol identification and definition for said split protocol, said split protocol including transmitting said first string to said MDS prior to said recording session and transmitting said second string to said MDS following said recording session, said protocol control means being operative for performing said split protocol by keying said protocol storage means in accordance with said split protocol identificaton.

8. The apparatus of claim 7 wherein each said handshake protocol is performed in successive states, said screen display means being operative for displaying said generic protocol screens with screen locations for entering information designating a current state and a next state, said split protocol including a predetermined state for performing said recording session and for returning thereafter to said protocol session, said split protocol definition including a designation for said predetermined state entered into said screen location for said current state.

9. The apparatus of claim 1 further including an administration terminal for said MDS, said screen display means being in said administration terminal and said means for entering being a keyboard thereof.

10. In a Voice Messaging System (VMS) for use in a telecommuication system, said VMS including an Intercept Processing Unit (IPU) and a Message Delivery System (MDS), said IPU intercepting an incomplete call placed in said telecommunication system by a caller to a called telephone number, said MDS including a service of delivering to said called telephone number, a voice message recorded by said caller in said MDS, said voice message being recorded by said caller in said MDS during a recording session, said IPU transferring call related parameters to said MDS in accordance with a handshake protocol therebetween during a protocol session; split handshake protocol control apparatus comprising message recording means for controlling recording of said voice message from said caller in said MDS during said recording session, and protocol control means for splitting said protocol session to occur before and after said recording session by controlling transfer of a first string of said parameters from said IPU to said MDS prior to said recording session and controlling transfer of a second string of said parameters from said IPU to said MDS following said recording session, thereby performing a split handshake protocol.

11. The apparatus of claim 10 further including screen display means for displaying protocol maintenance screens into which information can be entered to identify and define said split handshake protocol, thereby providing a protocol identification and definition for said split handshake protocol, means for entering said information into said screens, and protocol storage means for storing said protocol definition for said split handshake protocol, said protocol definition of said split handshake protocol being keyed by said protocol identification thereof, said protocol control means being operative to select said protocol definition for said split handshake protocol stored in said protocol storage means by keying said protocol storage means in accordance with said protocol identification for said split handshake protocol.

12. The apparatus of claim 11 wherein said split handshake protocol is performed in successive states, said screen display means being operative for displaying said protocol maintenance screens with a current state screen location and a next state screen location for entering information designating a current state and a next state, respectively, said split handshake protocol including a predetermined state for performing said recording session and returning thereafter to said protocol session, said definition for said split handshake protocol including a designation for said predetermined state entered into said current state screen location.

13. The apparatus of claim 11 wherein said split handshake protocol is performed in successive states, said screen display means being operative for displaying said protocol maintenance screens with a current state screen location and a next state screen location for entering information designating a current state and a next-state, respectively, said split handshake protocol including a predetermined state for performing said recording session and returning thereafter to said protocol session, said definition for said split handshake protocol including a designation for said predetermined state entered into said next state screen location, said MDS including a split protocol flag set during a state when the next state is said predetermined state, said MDS utilizing said split protocol flag to determine whether to return to said protocol session when in said recording session.

14. In a Voice Messaging System (VMS) for use in a telecommunication system, said VMS including a plurality of Intercept Processing Units (IPU) and a Message Delivery System (MDS), each said IPU transferring call related parameters to said MDS in accordance with a handshake protocol therebetween, said VMS system being adapted to include IPUs of different types, said handshake protocols of said different IPU types, respectively, being different with respect to each other; a generic handshake protocol method comprising displaying generic protocol screens into which information can be entered to identify and define each said handshake protocol, thereby providing a protocol identification and definition for each said handshake protocol, said protocol identifications being associated with said different IPU types, respectively, entering said information into said screens, storing in protocol storage means said protocol definition for each said handshake protocol of each said different IPU type, said protocol definition of each handshake protocol being keyed by said protocol identification of the associated IPU type, and performing a particular handshake protocol with an IPU that has called said MDS, said particular handshake protocol being selected from said protocol definitions stored in said protocol storage means by keying said protocol storage means in accordance with said protocol identification associated with said calling IPU.

15. The method of claim 14 wherein each said protocol definition includes at least one string of specific call related parameters to be transferred from an IPU to said MDS, each of said specific call related parameters having an ordered location in said string and a field length associated therewith, said displaying step further including displaying said generic protocol screens with a generic list of call related parameters, including said specific call related parameters, each of said call related parameters of said generic list having an order entry location and a length entry location associated therewith on said screens for entering said ordered location in said string and said field length of each of said specific call related parameters of said string.

16. The method of claim 15 wherein said displaying step further includes displaying said generic protocol screens with screen locations for entering information regarding delimiter characters separating fields of said parameters in said string.

17. The method of claim 14 wherein each said IPU is operative for intercepting calls placed in said telecommunication system that are busy or do not answer, said displaying step further including displaying said generic protocol screens with screen locations for entering information that will identify if a call is busy or did not answer and information that will identify the type of call placed.

18. The method of claim 15 wherein each said IPU is operative for intercepting calls placed in said telecommunication system, each said handshake protocol being performed in successive states, said displaying step further including displaying said generic protocol screens with screen locations for entering information designating a current state and information designating a next state in accordance with various conditions of said calls.

19. The method of claim 18 wherein said displaying step further includes displaying said generic protocol screens with screen locations for entering information identifying signals to be sent by said MDS to an IPU during said current state in accordance with said various conditions of said calls.

20. The method of claim 14 wherein each said IPU is operative for intercepting calls placed by a caller to a called telephone in said telecommunication system, said VMS includes a service for delivering a voice message to said called telephone recorded by said caller in the event of an incomplete call, said voice message being recorded in said MDS during a recording session, including a split protocol as one of said handshake protocols, said handshake protocol definition of said split protocol including first and second strings of specific call related parameters to be transferred from an IPU to said MDS during a protocol session, said displaying step further including displaying said generic protocol screens with screen locations for entering information to identify and define said split protocol, thereby providing a split protocol identification and definition for said split protocol, said split protocol including transmitting said first string to said MDS prior to said recording session and transmitting said second string to said MDS following said recording session, and performing said split protocol by keying said protocol storage means in accordance with said split protocol identificaton.

21. The method of claim 20 wherein each said handshake protocol is performed in successive states, said displaying step further including displaying said generic protocol screens with screen locations for entering information designating a current state and a next state, said split protocol including a predetermined state for performing said recording session and for returning thereafter to said protocol session, said split protocol definition including a designation for said predetermined state entered into said screen location for said current state.

22. In a Voice Messaging System (VMS) for use in a telecommuication system, said VMS including an Intercept Processing Unit (IPU) and a Message Delivery System (MDS), said IPU intercepting an incomplete call placed in said telecommunication system by a caller to a called telephone number, said MDS including a service of delivering to said called telephone number, a voice message recorded by said caller in said MDS, said voice message being recorded by said caller in said MDS during a recording session, said IPU transferring call related parameters to said MDS in accordance with a handshake protocol therebetween during a protocol session; a split handshake protocol control method comprising recording said voice message from said caller in said MDS during said recording session, and splitting said protocol session to occur before and after said recording session by transferring a first string of said parameters from said IPU to said MDS prior to said recording session and transferring a second string of said parameters from said IPU to said MDS following said recording session, thereby performing a split handshake protocol.

23. The method of claim 22 further including displaying protocol maintenance screens into which information can be entered to identify and define said split handshake protocol, thereby providing a protocol identification and definition for said split handshake protocol, entering said information into said screens, and storing in protocol storage mean said protocol definition for said split handshake protocol, said protocol definition of said split handshake protocol being keyed by said protocol identification thereof, selecting said protocol definition for said split handshake protocol stored in said protocol storage means by keying said protocol storage means in accordance with said protocol identification for said split handshake protocol.

24. The method of claim 23 wherein said split handshake protocol is performed in successive states, said displaying step further including displaying said protocol maintenance screens with a current state screen location and a next state screen location for entering information designating a current state and a next state, respectively, said split handshake protocol including a predetermined state for performing said recording session and returning thereafter to said protocol session, said definition for said split handshake protocol including a designation for said predetermined state entered into said current state screen location.

25. The method of claim 23 wherein said split handshake protocol is performed in successive states, said displaying step further including displaying said protocol maintenance screens with a current state screen location and a next state screen location for entering information designating a current state and a next state, respectively, said split handshake protocol including a predetermined state for performing said recording session and returning thereafter to said protocol session, said definition for said split handshake protocol including a designation for said predetermined state entered into said next state screen location, setting a split protocol flag during a state when the next state is said predetermined state, said MDS utilizing said split protocol flag to determine whether to return to said protocol session when in said recording session.

* * * * *